March 29, 1960 J. GAULD 2,930,225
PRESS FOR CALIBRATING PROVING RINGS AND
OTHER LOAD MEASURING INSTRUMENTS
Filed July 19, 1957 2 Sheets-Sheet 1
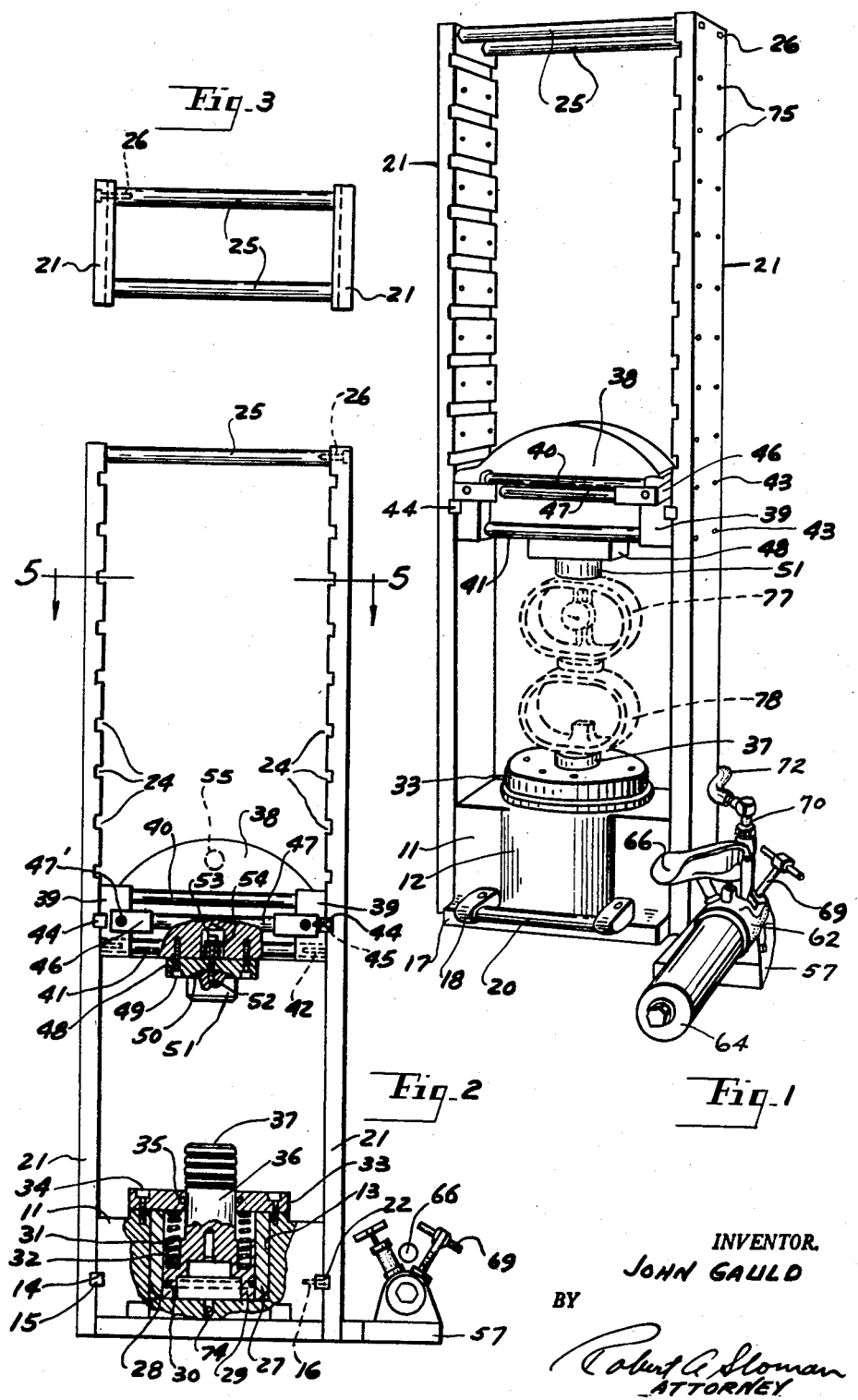
INVENTOR.
JOHN GAULD
BY
Robert A. Sloman
ATTORNEY March 29, 1960 J. GAULD 2,930,225
PRESS FOR CALIBRATING PROVING RINGS AND
OTHER LOAD MEASURING INSTRUMENTS
Filed July 19, 1957 2 Sheets-Sheet 2

INVENTOR.
JOHN GAULD
BY
Robert A. Sloman
ATTORNEY

United States Patent Office 2,930,225
Patented Mar. 29, 1960

2,930,225

PRESS FOR CALIBRATING PROVING RINGS AND OTHER LOAD MEASURING INSTRUMENTS

John Gauld, Detroit, Mich., assignor to Steel City Testing Machines, Inc., Detroit, Mich., a corporation of Michigan Application July 19, 1957, Serial No. 673,050

8 Claims. (Cl. 73—94)

This invention relates to a portable testing press and more particularly to a press for calibrating proving rings or other load measuring instruments.

It is the object of the present invention to provide a novel and simplified portable testing press which may be adapted for a number of testing purposes and which is compactly arranged to facilitate shipping.

It is the further object of this invention to provide a novel combination including a simplified means for manually developing hydraulic pressures within a cylinder and for transmitting the same to a movable load supporting anvil.

It is another object to provide an adjustable head within the uprights forming a part of the press together with a novel mounting for securing the head immovably in any one of a plurality of vertically adjusted positions for effecting a setting of the stationary anvil depending from said head in vertically spaced relation to and in alignment with the pressure exerting movable anvil.

It is another object to make the present press of aluminum parts where possible to provide a light article of manufacture, and incorporate within the vertically adjustable preferable aluminum head steel bar reinforcements by which said head may be effectively and rigidly secured in adjusted position.

It is another object to provide a novel support for the pressure developing pump assembly together with means whereby said pump and support may be pivoted into parallel engaging relation with one of the press uprights to facilitate shipping.

These and other objects will be seen from the following specification and claims in conjunction with the appended drawings in which:

Fig. 1 is a perspective view of the present portable testing press.

Fig. 2 is a front elevational view thereof, partly broken away and sectioned for illustration.

Fig. 3 is a plan view of the top portion thereof.

Figures 4, 5:
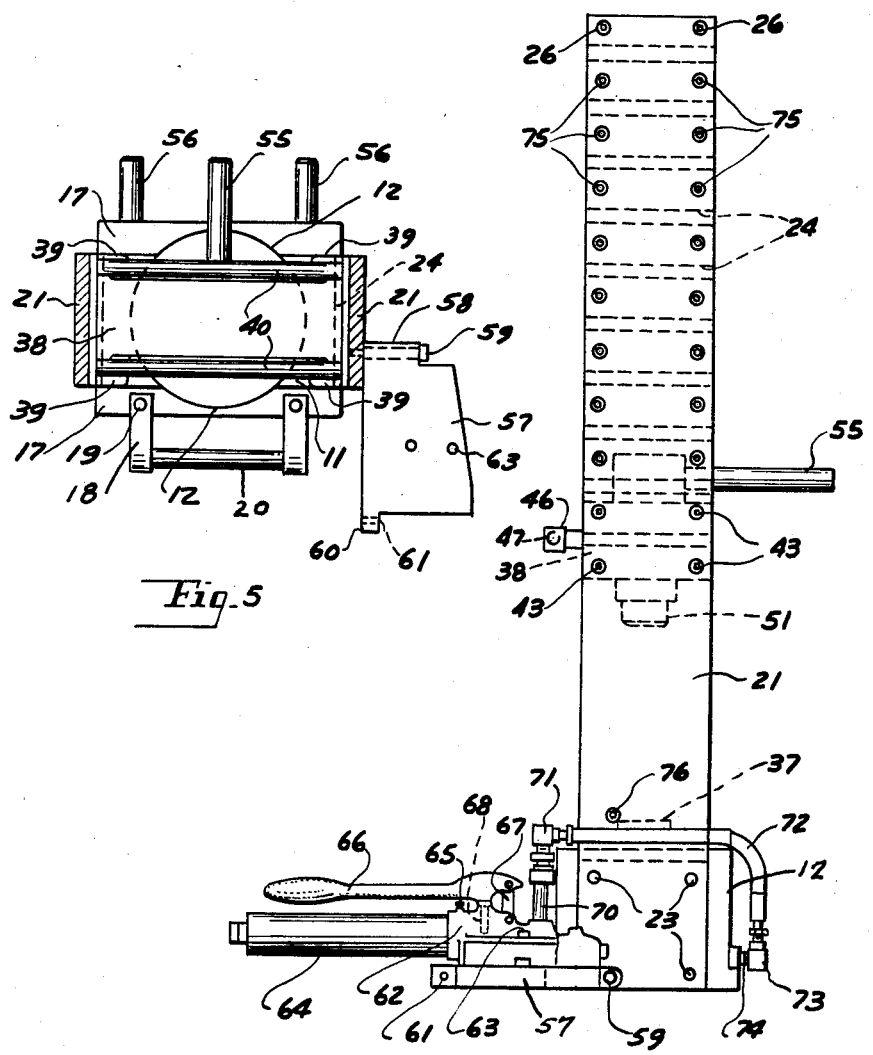
Fig. 4 is a side elevational view thereof.
Fig. 5 is a section taken on line 5—5 of Fig. 2.

It will be understood that the above drawings illustrate a preferred embodiment of the invention and that other embodiments are contemplated within the scope of the claims hereafter set forth.

Referring to the drawings, the present portable light weight testing press includes preferably aluminum main body or casting 11 defining cylinder 12 having cylindrical bore 13, Fig. 2.

Transverse undercut slots 14 of square cross section are formed in the opposite ends of body 11 and receive therein the elongated similarly shaped keys 15 which are secured in said slots by the fasteners 16 and which project laterally outward from the ends of said body.

Said body also includes the forwardly and rearwardly arranged flanges 17 at its lower end upon one of which are mounted a pair of spaced handle supports 18 secured thereto at 19 with a suitable aluminum rod 20 extending therebetween.

Body 11 is positioned between a pair of preferably aluminum uprights or plates 21 arranged in parallel spaced relation, being secured between the lower ends of said uprights by a plurality of fasteners 23, Fig. 4.

A pair of opposed undercut transverse slots 22 of square shape in cross section are formed upon the interior of said uprights to cooperatively receive the projecting portions of keys 15 which with the fasteners 23 define the securing means for the body 11 within uprights 21.

Additional opposed vertically spaced pairs of undercut slots 24 are formed within the interior surfaces of said uprights starting intermediate the ends thereof and extending to their upper ends.

A pair of steel rods 25 are interposed in parallel spaced relation between the upper ends of said uprights and are secured therebetween by the screws or fasteners 26 which extend through openings 75 formed through uprights 21.

As shown in Fig. 2, a hardened ground and lapped steel cylindrical liner 27 is snugly fitted into the bore 13 of body 11, the lower outer edge of said liner being annularly tapered providing at 28 a higher amount of stress at the line of contact between the lower edge of the said liner and body 11.

Reciprocal piston 29 is slidably positioned within the liner, there being a suitable O ring type of seal 30 carried by said piston in sweeping engagement with said liner.

A series of upright bores 31 are formed within the top of piston 29 to cooperatively receive the lower ends of a plurality of coiled springs 32. Their upper ends are retainingly engaged by the centrally apertured closure disc 33 secured upon the raised central portion of body 11 by a series of fasteners 34. Sealing ring 35 is nested within disc 33 adjacent its aperture to cooperatively engage rod 36 which projects from said piston and carries at its upper end one or a plurality of anvils 37 in vertical registry.

There is also positioned within uprights 21 preferably aluminum head 38 which is generally of rectangular shape in cross section to be slidably received between said uprights. Opposed pairs of forwardly and rearwardly extending bosses 39 project from opposite ends and opposite sides of said head, said bosses being apertured to slidably and snugly receive the ends of a pair of upper steel reinforcing rods 40 and a second horizontally spaced pair of lower reinforcing steel rods 41.

The outer ends of the four rods 40 and 41 are suitably apertured and threaded as at 42, Fig. 2, and are adapted to receive the steel fasteners or screws 43, Fig. 4, for immovably securing head 38 in any desired position of vertical adjustment within the limits shown in Fig. 2.

The opposite ends of head 38 including bosses 39 have undercut transverse slots formed therein which cooperatively receive the elongated square shaped keys 44 which project outwardly beyond the ends of said head and are secured thereto by fasteners 45. The projecting portions of said keys cooperatively nest within the adjacent opposed pair of notches 24 formed within uprights 21.

These keys in cooperation with the steel fasteners 43 provide an effective means of rigidly securing the aluminum head between the aluminum uprights utilizing the steel reinforced bars 40 and 41 and the steel screws 43.

Arranged forwardly of head 38 there is provided a handle to facilitate lifting, which includes the pair of spaced blocks 46 transversely apertured to receive the ends of an aluminum bar 47, said blocks being secured to bosses 39 by fasteners 47′.

Anvil mounting block 48 is centrally secured by fasteners 49 to the undersurface of head 38 and includes the central or axial concave surface 50 adapted to cooperatively receive the convex upper end of the stationary anvil 51.

Anvil 51 is yieldingly mounted upon and extends from block 48 to which it is secured before the said block is mounted upon head 38. The anvil mounting includes the bolt 52 which extends down through a central aperture of block 48 and threads into anvil 51, there being a head and washer 53 at the upper end of said bolt which is spaced above the top of block 48, there being a suitable coiled spring 54 interposed between said block and the head and washer 53.

This defines a self-aligning adjustable relation between anvil 51 and the carrying block 48. Upon assembly, the spring and bolt 53—54 are projected up into an axial bore in the undersurface of head 38 after which block 48 is immovably secured in position by screws 49.

As shown in Fig. 4 there is provided a rearwardly extending preferably aluminum rod 55 carried by an upper extension of head 38 which normally projects rearwardly of uprights 21. As shown only in Fig. 5, there is an additional pair of cooperating rods 56 which extend rearwardly from a portion of the main body 11. The purpose of these rods is to provide a suitable support for the press when it is tipped over and inserted within a shipping container.

Referring to Fig. 5, there is shown a pump mounting plate 57 whose rear extension 58 is transversely apertured to receive the fastening bolt 59 which is threaded into the lower end of one of the uprights 21 providing a pivotal mounting.

This plate serves as a support, as hereafter described, for the manual pump. The forward end of plate 57 has a projection 60 transversely apertured at 61 which is adapted to receive a second bolt, whereby when the press is arranged for shipping or storage, plate 57 may be pivoted from the horizontal position shown in Fig. 4 to a substantially vertical position, so that the last mentioned bolt extending through opening 61 may threadedly engage the aperture 76 in upright 21 for securing plate 57 and associated pump mechanism in an upright compact position to facilitate shipment.

There is incorporated into the present device as an element in the combination, a hydraulic pump adapted for creating variable pressures within cylinder 27 up to 10,000 lbs. per square inch, for developing loads through piston 29 and lower anvil 37 up to 150,000 lbs.

The particular detail of the pump forms no part of the present invention excepting to the extent that such pump is an element in the complete device and includes manual means namely, the pump handle 66 and associated piston 68 within the pump housing 62 for delivering fluid under pressure to outlet 70. For this purpose the pump housing 62 is mounted upon plate 57 and secured thereto by the fasteners 63.

Said pump includes the forwardly extending oil or other fluid reservoir 64 which communicates with the pump piston 68 and a suitable delivery passage, including proper check valves. Pump handle 66 swivelly joined to piston 68, is pivotally mounted at one end to the upper end of stirrup 67, Fig. 4. The lower end of the stirrup is pivotally connected to pump housing 62.

Accordingly vertical arcuate manual pumping movements of handle 66 are adapted to deliver pressure fluid through the outlet 70 provided the pump operation valve 69 shown in Fig. 2 is turned to its lowermost position.

This pressure fluid is delivered through fitting 71, through the flexible high pressure conduit 72 and through fitting 73 into cylinder inlet 74, Fig. 2.

A vertical series of horizontally spaced pairs of transverse apertures 75 are formed through the uprights 21 to the upper portions thereof and are adapted to receive the steel screws 43 depending upon the vertical position of head 38. It is contemplated that said head might be raised to the uppermost slots 24, and in that case the rods or spacers 25 are removed.

In Fig. 1 there is shown in dotted lines, for illustration, a pair of proving rings 77—78, one of which has been calibrated accurately and the other of which is to be calibrated in accordance with various loads developed within the press through the pumping mechanism above described. These rinks are interposed between anvils 37 and 51.

It is contemplated that a pressure gauge may be mounted upon the pump housing, if desired, for normal compression testing.

Upon completion of a particular operation, pressure is released from anvil 37 by unscrewing the pump operating valve 69 permitting fluid to return to reservoir 64.

Having described my invention, reference should now be had to the following claims.

I claim:

1. A portable testing press comprising a pair of spaced upright plates, a body having an upright cylindrical bore interposed between and engaging the lower ends of said plates and secured thereto and defining therewith a base, a reciprocal piston in said bore, a rod on said piston projecting through said body and thereabove, a load supporting anvil axially mounted on said rod, a head of rectangular horizontal cross section slidably interposed between and engaging said plates, vertically adjustable therein and immovably secured thereto, a top anvil depending from said head in axial alignment with said first anvil, a hydraulic hand pump assembly including a fluid reservoir, a pressure fluid delivery conduit interconnecting said pump assembly and the interior of said bore below the piston, there being opposed pairs of undercut elongated slots of rectangular cross section within the interior surfaces of said plates and corresponding undercut slots of rectangular cross section formed in said body and head at their opposite ends, and keys of rectangular cross section nested in said body and head slots, secured therein and retainingly projected within corresponding adjacent slots in said plates.

2. The testing press of claim 1, said piston being normally biased downwardly, and a spacer interposed between and secured to the upper ends of said plates.

3. The testing press of claim 1, and a horizontally disposed mounting plate pivotally connected adjacent its rear to one of said plates with its bottom in horizontal alignment with the bottom of said base, said hydraulic pump being secured upon said mounting plate.

4. A portable testing press comprising a pair of spaced upright plates, a body having an upright cylindrical bore interposed between and engaging the lower ends of said plates and secured thereto and defining therewith a base, a reciprocal piston in said bore, a rod on said piston projecting through said body and thereabove, a load supporting anvil axially mounted on said rod, a head of rectangular horizontal cross section slidably interposed between and engaging said plates, vertically adjustable therein and immovably secured thereto, a top anvil depending from said head in axial alignment with said first anvil, a hydraulic hand pump assembly including a fluid reservoir, a pressure fluid delivery conduit interconnecting said pump assembly and the interior of said bore below the piston, there being a series of longitudinally spaced opposed pairs of undercut slots of rectangular cross section within the interior surfaces of said plates and corresponding undercut slots of rectangular cross section in opposite ends of said head, and similarly shaped keys nested and secured in said head slots and retainingly projecting within adjacent slots in said plates.

5. A portable testing press comprising a pair of spaced upright plates, a body having an upright cylindrical bore interposed between and engaging the lower ends of said plates and secured thereto and defining therewith a base, a reciprocal piston in said bore, a rod on said piston projecting through said body and thereabove, a load supporting anvil axially mounted on said rod, a head of rectangular horizontal cross section slidably interposed between and engaging said plates, vertically adjustable therein and immovably secured thereto, a top anvil depending from said head in axial alignment with said first anvil, a hydraulic hand pump assembly including a fluid reservoir, a pressure fluid delivery conduit interconnecting said pump assembly and the interior of said bore below the piston, opposed pairs of spaced bosses at the ends of said head and on opposite sides thereof, a rod on each side of said head with their ends snugly projected through said bosses, the outer ends of said rods having interiorly threaded bores, and a plurality of fasteners extending through said plates threadedly engaging within said rod bores.

6. A portable testing press comprising a pair of spaced upright plates, a body having an upright cylindrical bore interposed between and engaging the lower ends of said plates and secured thereto and defining therewith a base, a reciprocal piston in said bore, a rod on said piston projecting through said body and thereabove, a load supporting anvil axially mounted on said rod, a head of rectangular horizontal cross section slidably interposed between and engaging said plates, vertically adjustable therein and immovably secured thereto, a top anvil depending from said head in axial alignment with said first anvil, a hydraulic hand pump assembly including a fluid reservoir, a pressure fluid delivery conduit interconnecting said pump assembly and the interior of said bore below the piston, opposed pairs of spaced bosses at the ends of said head and on opposite sides thereof, a rod on each side of said head with their ends snugly projected through said bosses, the outer ends of said rods having interiorly threaded bores, a plurality of hardened fasteners extending through said plates threadedly engaging within said rod bores, a pair of blocks respectively mounted and secured upon one of said pairs of bosses, and a handle bar between said blocks with its ends snugly extending through said blocks.

7. A portable testing press comprising a pair of spaced upright plates, a body having an upright cylindrical bore interposed between and engaging the lower ends of said plates and secured thereto and defining therewith a base, a reciprocal piston in said bore, a rod on said piston projecting through said body and thereabove, a load supporting anvil axially mounted on said rod, a head of rectangular horizontal cross section slidably interposed between and engaging said plates, vertically adjustable therein and immovably secured thereto, a top anvil depending from said head in axial alignment with said first anvil, a hydraulic hand pump assembly including a fluid reservoir, a pressure fluid delivery conduit interconnecting said pump assembly and the interior of said bore below the piston, there being a series of longitudinally spaced opposed pairs of undercut slots within the interior surfaces of said plates and corresponding undercut slots in opposite ends of said head, and keys nested and secured in said head slots and retainingly projecting within adjacent slots in said plates, opposed pairs of spaced bosses at the ends of said head and on opposite sides thereof, a rod on each side of said head with their ends snugly projected through said bosses, the outer ends of said rods having interiorly threaded bores, and a plurality of fasteners extending through said plates threadedly engaging within said rod bores.

8. A portable testing press comprising a pair of spaced upright plates, a body having an upright cylindrical bore interposed between and engaging the lower ends of said plates and secured thereto and defining therewith a base, a reciprocal piston in said bore, a rod on said piston projecting through said body and thereabove, a load supporting anvil axially mounted on said rod, a head of rectangular horizontal cross section slidably interposed between and engaging said plates, vertically adjustable therein and immovably secured thereto, a top anvil depending from said head in axial alignment with said first anvil, a hydraulic hand pump assembly including a fluid reservoir, a pressure fluid delivery conduit interconnecting said pump assembly and the interior of said bore below the piston, opposed pairs of spaced bosses at the ends of said head and on opposite sides thereof, a rod on each side of said head with their ends snugly projected through said bosses, the outer ends of said rods having interiorly threaded bores, and a plurality of fasteners extending through said plates threadedly engaging within said rod bores, said plates, body, head, bosses being constructed of aluminum and said rods and fasteners being made of steel.

References Cited in the file of this patent

UNITED STATES PATENTS

| | | |
|---|---|---|
| 1,985,598 | Carver | Dec. 25, 1934 |
| 2,291,106 | Ruch | July 28, 1942 |
| 2,526,987 | Wilson | Oct. 24, 1950 |